(12) United States Patent
Vadlakonda et al.

(10) Patent No.: US 8,605,605 B1
(45) Date of Patent: Dec. 10, 2013

(54) SETTING INITIAL DATA TRANSMISSION SIZE BASED ON PRIOR TRANSMISSION

(75) Inventors: Sravan Vadlakonda, Sunnyvale, CA (US); Rohini Kasturi, Livermore, CA (US); Nitin Gugle, Cupertino, CA (US); Steven A Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 494 days.

(21) Appl. No.: 12/265,393

(22) Filed: Nov. 5, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................... 370/252; 370/277

(58) Field of Classification Search
USPC .......................... 370/232, 237, 252, 234, 235
See application file for complete search history.

(56) References Cited

U.S. PATENT DOCUMENTS

| | | | |
|---|---|---|---|
| 6,757,255 B1* | 6/2004 | Aoki et al. | 370/252 |
| 7,216,164 B1* | 5/2007 | Whitmore et al. | 709/224 |
| 2004/0120255 A1* | 6/2004 | Gross et al. | 370/235 |
| 2008/0052394 A1* | 2/2008 | Bugenhagen et al. | 709/224 |
| 2008/0144527 A1* | 6/2008 | Marcondes et al. | 370/254 |
| 2008/0281979 A1* | 11/2008 | Keeler | 709/233 |
| 2009/0063696 A1* | 3/2009 | Wang et al. | 709/232 |
| 2009/0180429 A1* | 7/2009 | Stevens et al. | 370/329 |
| 2009/0245107 A1* | 10/2009 | Krishnaswamy et al. | 370/232 |
| 2010/0011119 A1* | 1/2010 | Knowlton et al. | 709/235 |
| 2010/0098092 A1* | 4/2010 | Luo et al. | 370/401 |

OTHER PUBLICATIONS

Jacobson et al., "TCP Extensions for High Performance", Network Working Group, RFC 1323, May 1992, 37 pages.
Juniper Networks, Inc., "The WX Framework", Oct. 2005, 20 pages.

* cited by examiner

*Primary Examiner* — Huy D Vu
*Assistant Examiner* — Adnan Baig
(74) *Attorney, Agent, or Firm* — Harrity & Harrity, LLP (57) ABSTRACT

A network device is configured to monitor a data size of data transmitted to a particular destination during a particular time period, determine, based on the monitored data size, an average data size for the particular destination and for the particular time period, establish a data connection toward the particular destination during the particular time period, set an initial data size for the data connection based on the average data size, and transmit data on the data connection in an amount equal to the initial data size.

30 Claims, 9 Drawing Sheets

| BIT OFFSET | BITS 0-3 | BITS 4-7 | BITS 8-15 | BITS 16-31 |
|---|---|---|---|---|
| 0 | SOURCE PORT | | | DESTINATION PORT |
| 32 | SEQUENCE NUMBER | | | |
| 64 | ACKNOWLEDGMENT NUMBER | | | |
| 96 | DATA OFFSET | RES | FLAGS | WINDOW SIZE |
| 128 | CHECKSUM | | | URGENT POINTER |
| 160 | OPTIONS | | | |
| 160/192+ | DATA | | | |

SETTING INITIAL DATA TRANSMISSION SIZE BASED ON PRIOR TRANSMISSION

BACKGROUND

Geographically distributed entities, such as businesses with multiple local offices in different locations, frequently desire to maintain a logically unified proprietary network that is accessible by all of the geographically distributed entities. To accomplish this, a wide area network (WAN) may be used to link the different locations.

Information technology managers within geographically distributed entities face the conflicting requirements of keeping costs down while providing users with new and faster applications. This conflict is most acute on the WAN, where costs can be high and getting applications to perform well is often hampered by limited bandwidth and high latency.

Products exist to help improve performance over the WAN portion of a network. These products may be based on a number of technologies, including data compression, data prefetching and caching, application-specific acceleration, and policy-based bandwidth allocation.

One such product is referred to as a WAN accelerator. WAN accelerators are typically installed by administrators at static locations (e.g., between a branch office and main office, such as one in the branch office and one in the main office). For example, the main office WAN accelerator may be connected to multiple branch office WAN accelerators, or a branch office WAN accelerator may also be connected to various other offices via their counterpart WAN accelerators. Multiple Transmission Control Protocol (TCP) connections are made via the WAN accelerators to carry TCP traffic originating between many endpoints within the network of one office to endpoints in the network of another office.

TCP uses an end-to-end flow control technique to avoid having a TCP sender send data too fast for the TCP receiver to reliably receive and process the data. This flow control technique takes the form of a sliding window. There are two forms of windows: a congestion window and an advertised window. The congestion window is used for flow control imposed by the sender, while the advertised window is for flow control imposed by the receiver.

A current technique used to adjust the window size is called the slow start algorithm. According to the slow start algorithm, when a new TCP connection is established, the sender sets the window size to a small size, such as one segment (where a segment may be set by the receiver or set equal to a default value, such as 536 or 512 bytes). The sender then starts by transmitting one segment to the receiver and waiting for an acknowledgement. When the sender receives the acknowledgement, the sender increments the window size from one segment to two segments. The sender then transmits two segments to the receiver and waits for acknowledgements. When each of these two segments is acknowledged, the sender increases the window size to four segments.

This process of exponential growth in the window size continues until congestion is detected (e.g., a timeout occurs before an acknowledgement is received, or duplicate acknowledgements are received). When congestion is detected, the sender may return the value of the window size to one segment, and begin increasing the window size as described above. Alternatively, the sender may return the value of the window size to another value (greater than one segment) and begin increasing the window size as described above. In either situation, the sender begins with a small window size (e.g., one segment).

SUMMARY

According to one implementation, an automated method may include monitoring a data size of data transmitted to a particular destination during a particular time period; determining, based on the monitored data size, an average data size for the particular destination and for the particular time period; establishing a data connection toward the particular destination during the particular time period; setting an initial data size for the data connection based on the average data size; and transmitting data on the data connection in an amount equal to the initial data size.

According to another implementation, a network device may include a processor that may monitor a window size of Transmission Control Protocol (TCP) data transmitted to a particular destination during a number of time periods, determine, based on the monitored window size, an average window size for the particular destination and for each of the time periods, establish a TCP connection toward the particular destination, determine a current time period of the number of time periods, determine an average window size corresponding to the current time period, set an initial window size for the TCP connection based on the average window size, and transmit data on the TCP connection in an amount equal to the initial window size.

According to yet another implementation, a system may include a first network device connected to a second network device via multiple paths through a wide area network. The first network device may monitor a data size of data transmitted to the second network device over each of the paths during a number of time periods, determine, based on the monitored data size, an average data size for each of the paths and for each of the time periods, establish a data connection with the second network device via one of the paths, determine a current time period of the number of time periods, determine an average data size corresponding to the current time period and the one of paths, set an initial data size for the data connection to the average data size, and transmit data on the data connection in an amount equal to the initial data size.

According to a further implementation, a network device may include means for recording a data size of data transmitted to a particular destination during a particular time period; means for determining, based on the recorded data size, an average data size for the particular destination and the particular time period; means for establishing a data connection toward the particular destination; means for identifying one or more services for the particular destination; means for determining that a current time period matches the particular time period; means for setting an initial data size for the data connection based on the average data size and the identified one or more services; and means for transmitting data on the data connection in an amount equal to the initial data size.

BRIEF DESCRIPTION OF THE DRAWINGS

The accompanying drawings, which are incorporated in and constitute a part of this specification, illustrate one or more embodiments of the invention and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

As described herein, a WAN acceleration device may increase application performance over a WAN. The WAN acceleration device may achieve the performance increase by selecting an initial TCP window size based on past performance between particular endpoints during particular time periods and/or one or more services (e.g., acceleration, data compression, data caching, and/or data prefetching services) selected for a particular endpoint. While the description below will focus on a technique involving TCP, the description is also applicable to other protocols, such as the User Datagram Protocol (UDP) and the HyperText Transfer Protocol (HTTP).

Exemplary Environment

Figure 1:
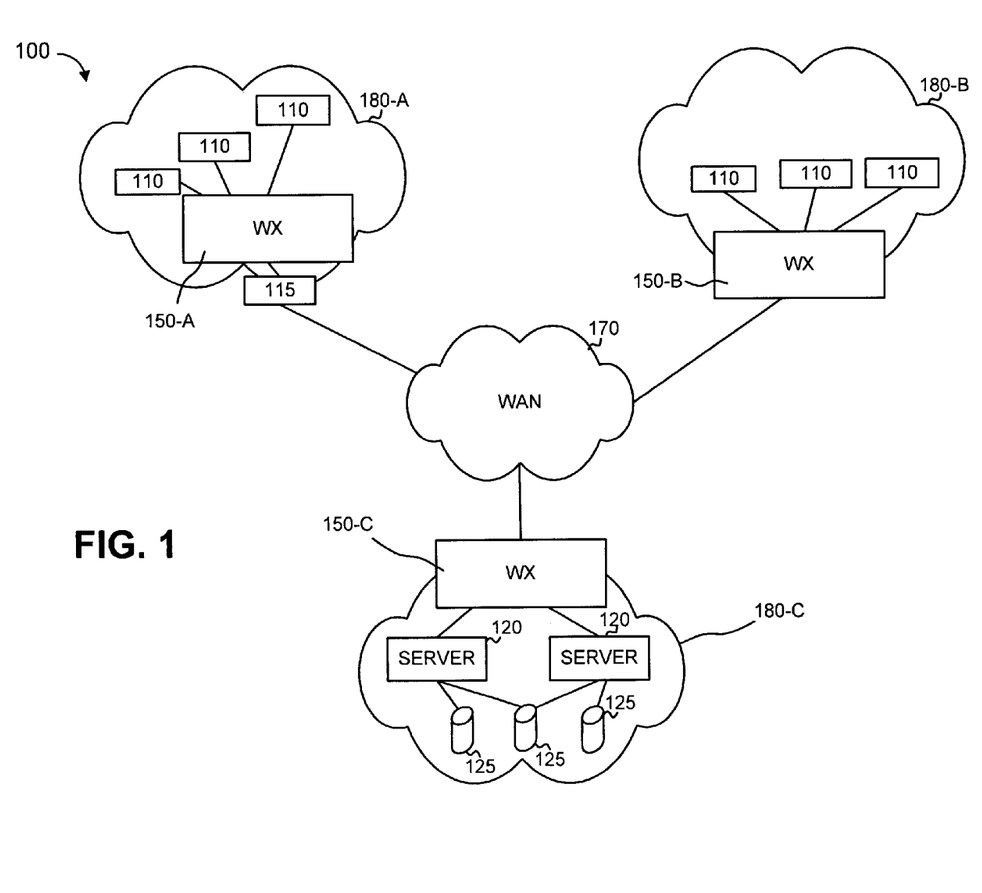
FIG. 1 is a diagram of an exemplary environment in which systems and methods, described herein, may be implemented.

FIG. 1 is a diagram of an exemplary environment 100 in which systems and methods, described herein, may be implemented. Environment 100 may include a wide area network (WAN) 170 and one or more private networks 180-A, 180-B, and 180-C (collectively referred to as private networks 180, and individually as private network 180). Private networks 180 may be geographically dispersed, and different private networks 180 may wish to communicate with one another over WAN 170. Private networks 180 may each, for example, be a local area network (LAN) for a branch office associated with a corporation or another entity. As another example, private networks 180-A and 180-B may be LANs for a corporate branch office, and private network 180-C may be a data center for the corporation.

WAN 170 may include a public network, such as the Internet, and may include a number of network devices, such as routers, switches, and/or gateways (not shown). In some implementations, WAN 170 may be implemented by privately owned or leased data lines between private networks 180, or by a combination of a public network and privately owned or leased data lines. In one implementation, data traffic between private networks 180 through WAN 170 may be characterized by one or more of increased cost, higher latency, or lower bandwidth than data traffic within a single corporate network 180. Accordingly, network applications accessing resources between a number of private networks 180 and across WAN 170 may tend to run less optimally than an application running locally at a private network 180.

Private networks 180 may each include a number of computing devices, such as, for example, endpoints 110, network security device(s) 115, servers 120, and databases 125. Endpoints 110 may include computing or communication devices of end-users, such as desktop computers, laptops, or mobile communication devices (e.g., cell phones or personal digital assistants (PDAs)). Network security devices 115 may include, for example, firewalls or other devices relating to network security. Servers 120 may include one or more devices designed to interact with and deliver information to other devices, such as endpoints 110. Databases 125 may include information repositories available on, for example, network 180-C. Servers 120 may, for example, serve data files or network applications to endpoints 110 over WAN 170. Servers 120 may interact with databases 125 when providing information to endpoints 110.

In the exemplary environment shown in FIG. 1, private networks 180-A and 180-B may be branch offices that include a number of endpoints 110, and private network 180-C may function as a data center that includes a number of servers 120, which may include file servers for private networks 180-A and 180-B. While FIG. 1 shows a particular number, configuration, and arrangement of private networks, in practice, there may be more, fewer, differently configured, and/or differently arranged private networks.

Private networks 180 may be associated with WAN acceleration devices (WXs) 150-A through 150-C (collectively referred to as WXs 150, and individually as WX 150). As shown in FIG. 1, for example, each of private networks 180-A through 180-C is associated with a corresponding WX 150-A, 150-B, and 150-C, respectively.

WXs 150 may include network devices designed to enhance the performance of applications running over WAN 170 between various ones of private networks 180. Each WX 150 may obtain adjacencies with other WXs 150. In other words, each WX 150 may automatically recognize adjacent (sometimes called "peer") WXs 150 and form logical connections to those adjacent WXs 150. The connection is called a "logical connection" because there may be a number of network devices (e.g., routers, switches, gateways, etc.) between them.

For example, assume that a user at one of endpoints 110 at private network 180-A would like to retrieve a file from a file server at private network 180-C. In this situation, WXs 150-A and 150-C may operate to decrease the latency and/or increase the bandwidth of WAN 170 by providing, for example, acceleration, data compression, data caching, and/or data prefetching services over WAN 170. Aspects of WXs 150 as they relate to acceleration will be particularly described in more detail herein. In particular, WXs 150-A through 150-C may perform techniques to increase the performance of specific applications and protocols over WAN 170 by cutting response times and optimizing traffic flows to deliver a more LAN-like experience to endpoints 110.

Exemplary WAN Acceleration Device

Figure 2:
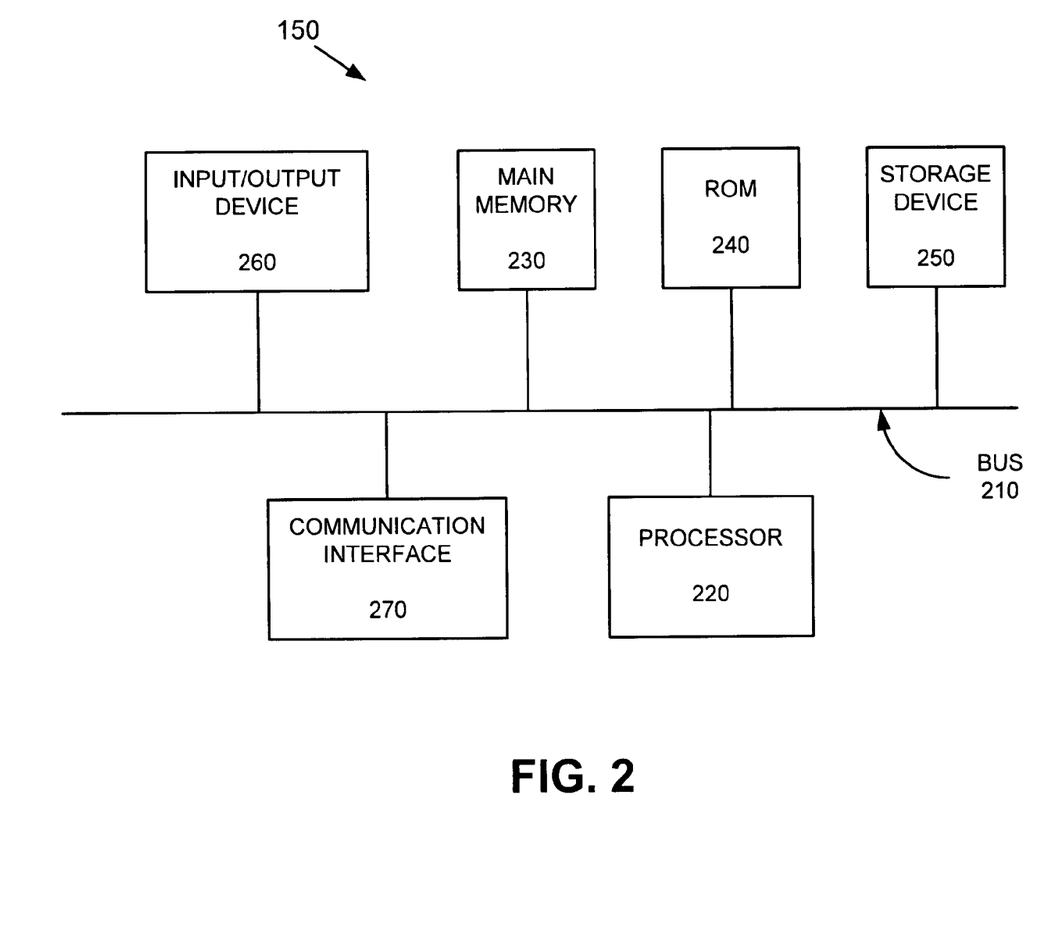
FIG. 2 is a diagram of exemplary components of a WAN acceleration device of FIG. 1.

FIG. 2 is a block diagram of exemplary components of a WX 150. As shown in FIG. 2, WX 150 may include a bus 210, a processor 220, a main memory 230, a read only memory (ROM) 240, a storage device 250, an input/output device 260, and a communication interface 270. While FIG. 2 shows particular components of WX 150, WX 150 may include different and/or differently arranged components in other implementations.

Bus 210 may include a path that permits communication among the components of WX 150. Processor 220 may include a processor, a microprocessor, an application specific integrated circuit (ASIC), a field programmable gate array (FPGA), or another type of processor that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic storage medium, such as a hard disk drive, or a removable memory, such as a flash memory.

Input/output device 260 may include a mechanism that permits an operator to input information to WX 150, such as a control button, and/or a mechanism that outputs information to the operator, such as a light emitting diode or some form of display. Communication interface 270 may include any transceiver-like mechanism that enables WX 150 to communicate with other devices and/or systems. In one implementation, communication interface 270 may include one or more ports, such as Ethernet ports, via which data may be received and/or transmitted.

WX 150 may perform certain operations, as described in detail below. WX 150 may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 270. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Process for Setting TCP Window Size

Figure 3:
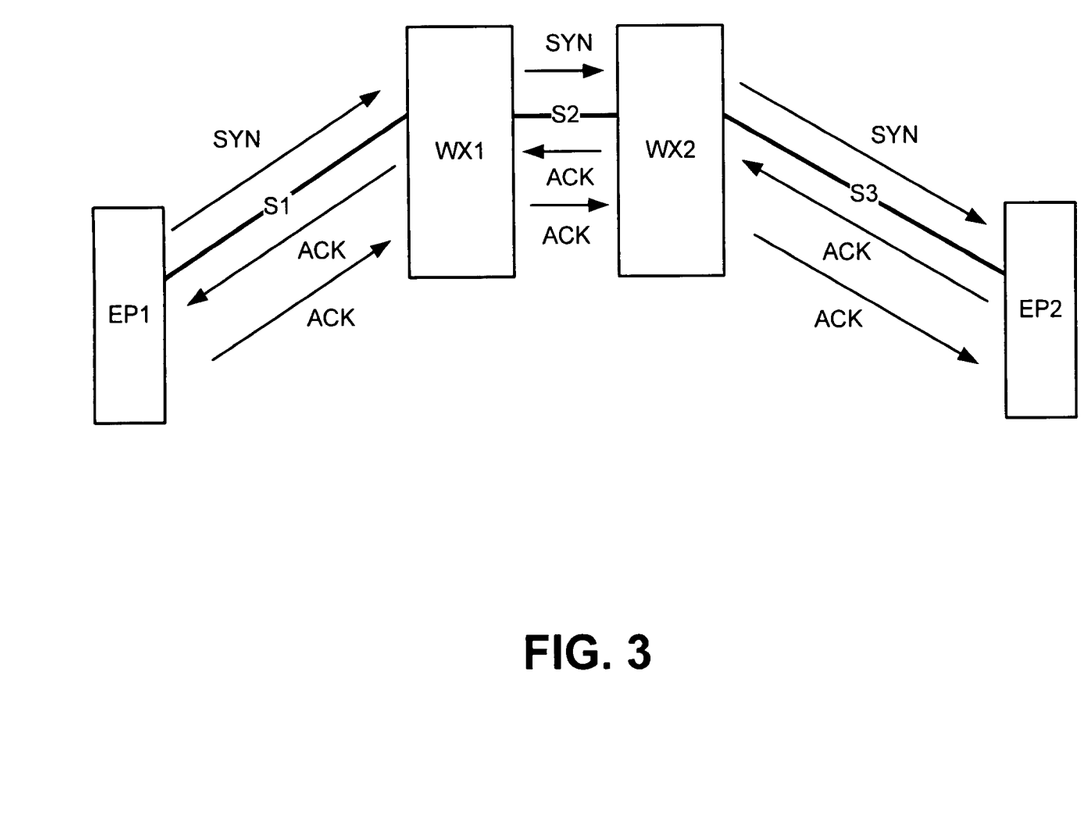
FIG. 3 is a diagram illustrating an example of setting up a TCP connection.

Before describing the operation of a WX 150 in additional detail, it may be beneficial to generally describe the exchange of data using TCP. FIG. 3 is a diagram illustrating an example of setting up a TCP connection. As shown in FIG. 3, assume that an endpoint EP1 wants to communicate with an endpoint EP2, and that this communication occurs through two WXs, referred to as WX1 and WX2. EP1 may establish a TCP connection by sending a synchronization (SYN) message to EP2, receiving an acknowledgement (ACK) message from EP2, and sending an acknowledgement (ACK) message back to EP2. This exchange of messages may actually cause multiple TCP connections to be established: one connection from EP1 to WX1 (e.g., the closest WX to EP1) (referred to as segment 1 (S1) in FIG. 3); one connection from WX1 to WX2 (associated with EP2) (referred to as segment 2 (S2) in FIG. 3); and one connection from WX2 to EP2 (referred to as segment 3 (S3) in FIG. 3).

Once segments 1, 2, and 3 have been established, EP1 can begin sending data to EP2. Data transmitted by EP1 may be proxied by WX1, sent from WX1 to WX2, and forwarded by WX2 to EP2. Similarly, data transmitted by EP2 may be proxied by WX2, sent from WX2 to WX1, and forwarded by WX1 to EP1. The data may be sent within a TCP message and acknowledged upon receipt. Any data that is not acknowledged may be retransmitted.

Figure 4:
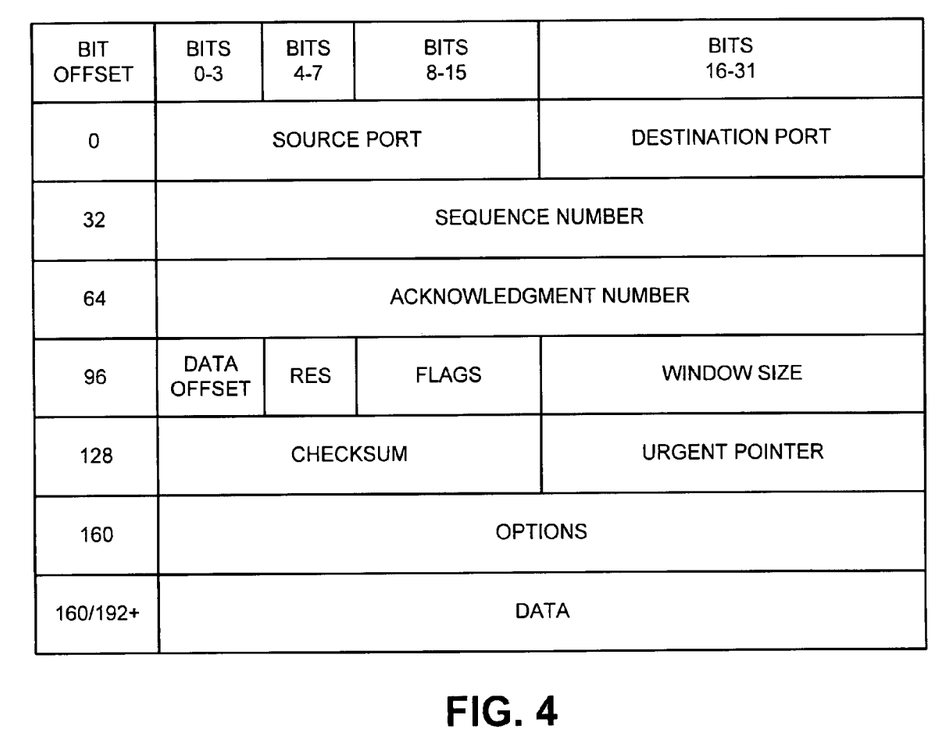
FIG. 4 is a diagram of an exemplary TCP message.

FIG. 4 is a diagram of an exemplary TCP message. As shown in FIG. 4, a TCP message may include a source port field, a destination port field, a sequence number field, an acknowledgement number field, a data offset field, a reserved (RES) field, a flags field, a window size field, a checksum field, an urgent pointer field, an options field, and a data field.

The source port field may identify the sending port. The destination port field may identify the receiving port. The sequence number field may store the sequence number of the first data byte. The acknowledgement number field may identify the next expected byte that the receiver is expecting. The data offset field may specify the size of the TCP header and, thus, the start of the TCP data field. The reserved (RES) field is reserved for future use. The flags field may store eight one bit control flags.

The window size field may identify the number of bytes (beyond the sequence number in the acknowledgment field) that the receiver is currently willing to receive. The checksum field may include data for error-checking of the TCP header and the TCP data. The urgent pointer field may include an offset from the sequence number indicating the last urgent data byte. The options field may include information regarding various TCP options.

The data field may store the payload, or data portion, of the TCP message. The payload may be any number of application layer protocols, such as HTTP, Telnet, Secure Shell (SSH), and File Transfer Protocol (FTP).

Figure 5:
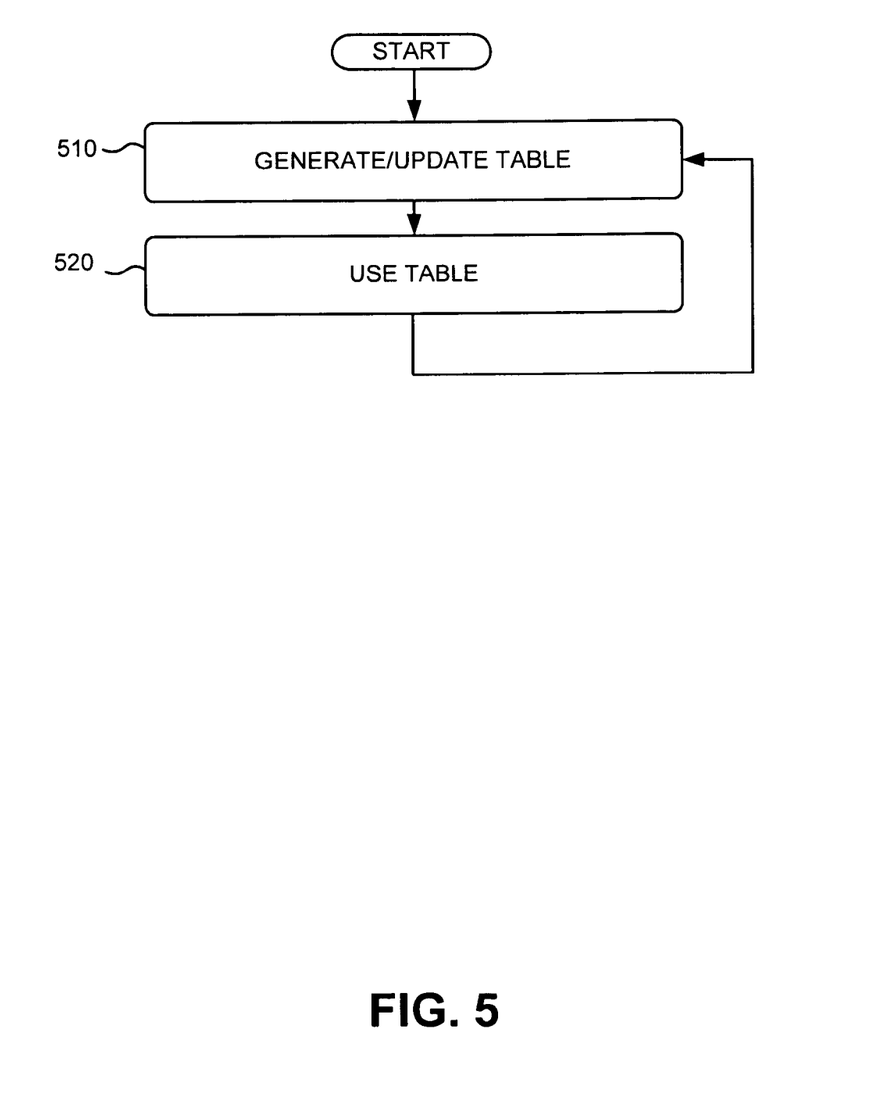
FIG. 5 is a flowchart illustrating an exemplary process for setting a TCP window size.

FIG. 5 is a flowchart illustrating an exemplary process for setting a TCP window size. The process of FIG. 5 may be performed by a WX (e.g., WX 150), a group of WXs, or a device operating in conjunction with a WX or a group of WXs.

The process of FIG. 5 may begin with generating or updating a table (block 510). Block 510 will be described in more detail with regard to FIG. 6. Generally, however, generation of the table may include determining the average window size used for data transmissions to a particular destination (or on a particular path to a particular destination) during particular time periods and storing the average window size in memory.

The process of FIG. 5 may continue with using the table (block 520). Block 520 will be described in more detail with regard to FIG. 7. Generally, however, using the table may include determining the current time period and a destination (or a path to the destination) for a TCP connection and setting the initial TCP window size to the average window size for the destination (or path) and the current time period.

The process of FIG. 5 may then return to block 510 where the table may be periodically or continuously updated as the average window size changes over time.

Figure 6:
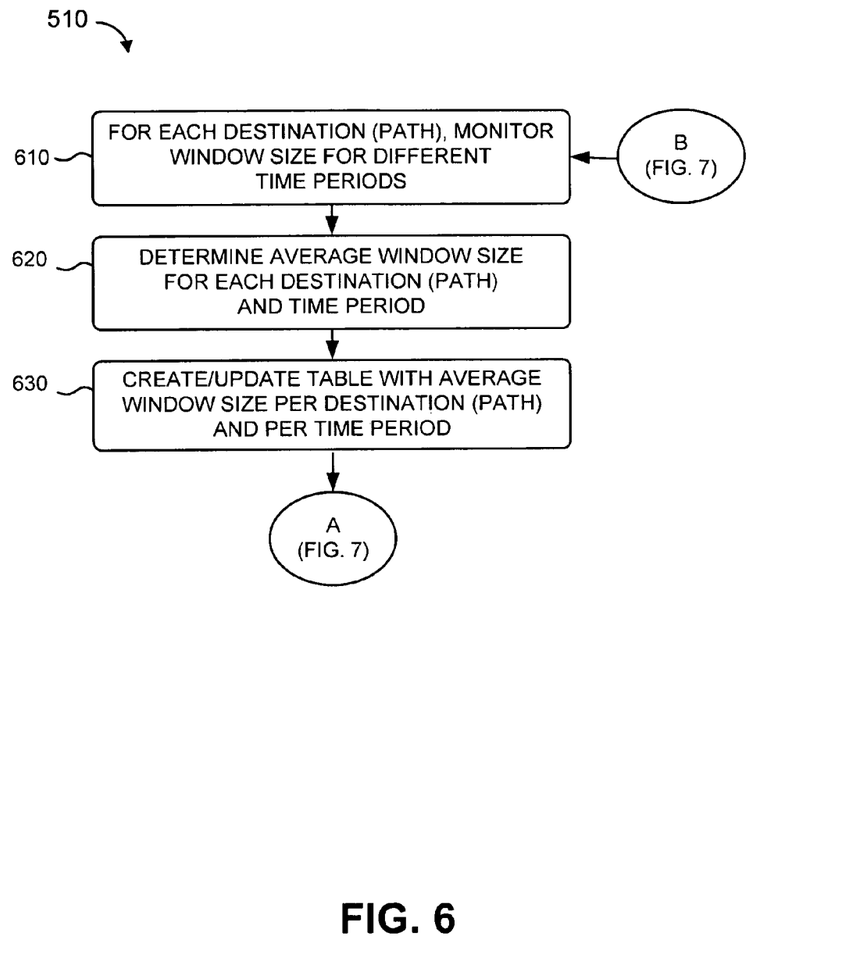
FIG. 6 is a flowchart illustrating an exemplary process for generating and/or updating a table.

FIG. 6 is a flowchart illustrating an exemplary process for generating and/or updating a table, such as generally described above with regard to block 510 (FIG. 5). The window size used in different time periods and for each destination (or path) may be monitored (e.g., recorded or tracked) (block 610). For example, a WX 150 may set up a TCP connection between two different endpoints 110. As explained above with regard to FIG. 3, for communication between EP1 and EP2, multiple TCP connections may be established: one connection between EP1 and WX1 (segment 1); one connection between WX1 and WX2 (segment 2); and one connection between WX2 and EP2 (segment 3). In one implementation, WX1, for example, may monitor the window size used only on segment 2 (i.e., the TCP connection between two WXs—WX1 and WX2). A reason for only monitoring the window size used on the TCP connection between two WXs is because this connection typically has high latency (e.g., greater than a threshold). The connections between the WXs and the endpoints typically have low latency (e.g., lower than a threshold). In another implementation, WX1 may also monitor the window size used on segment 1.

In some implementations, there may exist multiple paths between two WXs 150. The different paths may be identified by the particular WXs 150 located on the paths. In this case, a WX 150 may monitor the window size used on each of the paths.

For each destination (e.g., endpoint 110 or WX 150) (or each path to that destination), WX 150 may monitor the window size used in each of a number of time periods. A "time period," as used herein, may refer to any block of time. A time period may correspond to a time of day (e.g., between 1 pm and 2 pm, between 1 pm and 4 pm, etc.), a day of the week (e.g., Sunday, Saturday and Sunday, etc.), or any combination of a time of day and a day of the week (e.g., Sunday between 12 am and 6 am). In one implementation, the time periods may cover each conceivable day and/or time of the day in which data transmissions can occur.

The average window size for each destination (or path) and each time period may be determined (block 620). For example, WX 150 may calculate the average window size from the monitored window sizes used during a time period. The average window size calculation may be a moving average calculation or a calculation over some set period (e.g., the last 30 days, the last week, etc.). Alternatively, the average window size may be determined by determining where the window size "settles" during data transmissions on the TCP connection. For example, the window size may increase and/or decrease for subsequent data transmissions and eventually settle at an appropriate window size for further data transmissions on the TCP connection.

A table may be created or updated with the average window size per destination (or path) and per time period (block 630). For example, WX 150 may generate a table within memory that identifies the average window size for different time periods. In one implementation, WX 150 may generate a separate table for each destination (or path). In another implementation, WX 150 may generate a single table that includes information for multiple destinations (or paths). In one implementation, each WX 150 may create its own table(s). In another implementation, a WX 150 may share its table(s) with other WXs 150. The term "table," as used herein, may refer to any searchable form or arrangement of data within a memory.

Figure 7:
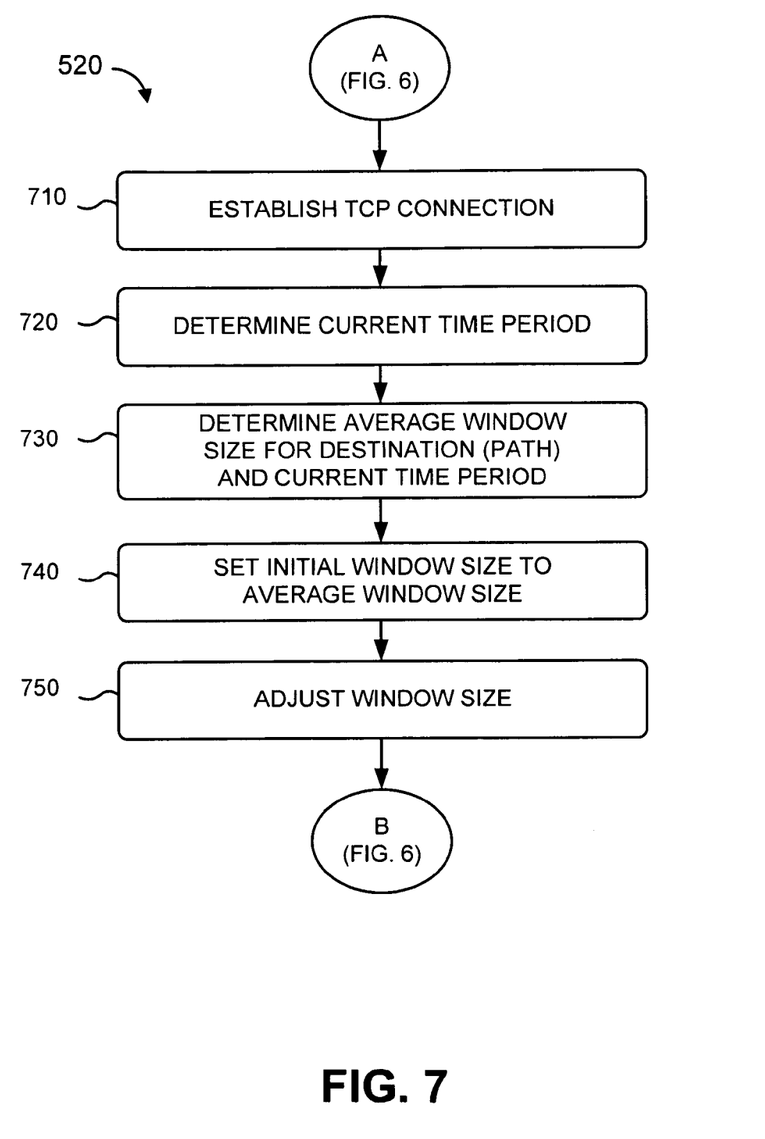
FIG. 7 is a flowchart illustrating an exemplary process for using the table of FIG. 6.

FIG. 7 is a flowchart illustrating an exemplary process 520 for using the table of FIG. 6, such as generally described above with regard to block 520 (FIG. 5). A TCP connection may be established (block 710). For example, a WX 150 may set up a TCP connection between two different endpoints 110. As explained above with regard to FIG. 3, for communication between EP1 and EP2, multiple TCP connections may be established: one connection between EP1 and WX1 (segment 1); one connection between WX1 and WX2 (segment 2); and one connection between WX2 and EP2 (segment 3).

The current time period may be determined (block 720). For example, a WX 150 (e.g., WX1 in FIG. 3) may determine the current time of day and/or day of the week by accessing a local or remote clock.

The average window size for the destination (or a path to the destination) and the current time period may be determined (block 730). For example, WX 150 (e.g., WX1 in FIG. 3) may access a table dedicated to the destination (or the path) and use information regarding the current time period as an index into the table to retrieve the average window size. In another implementation, WX 150 may access a table and use information regarding the destination (or the path) and/or the current time period as an index into the table to retrieve the average window size.

The initial window size for data transmission on the TCP connection may be set to the average window size (block 740). For example, WX 150 (e.g., WX1 in FIG. 3) may set the initial window size to the average window size and transmit an amount of data, equal to the average window size, on the TCP connection to an adjacent WX 150 (e.g., WX2 in FIG. 3). WX 150 may then wait for an acknowledgement from adjacent WX 150 (e.g., WX2 in FIG. 3).

In another implementation, the initial window size for data transmission on the TCP connection may be set as a function of the average window size and the particular service(s) (e.g., acceleration, data compression, data caching, and/or data prefetching services) selected for the destination. The function F may generally be represented as F (average window size, service(s)). For example, each particular service that was selected (or not selected) for the destination may factor into the determination of the initial window size by increasing or decreasing the average window size. In other words, rather than setting the initial window size equal to the average window size, the initial window size may be set based on both the average window size and the particular service(s) that were selected.

The window size may be adjusted (block 750). For example, when WX 150 (e.g., WX1 in FIG. 3) receives an acknowledgement from adjacent WX 150 (e.g., WX2 in FIG. 3), WX 150 (e.g., WX1 in FIG. 3) may increase the window size and transmit an amount of data, equal to the increased window size, to adjacent WX 150 (e.g., WX2 in FIG. 3). As long as acknowledgements are received, WX 150 (e.g., WX1 in FIG. 3) may continue increasing the window size for subsequent data transmissions. When congestion is detected (e.g., a timeout occurs before an acknowledgement is received, a threshold number of non-acknowledgements are detected, duplicate acknowledgements are received, or another technique to detect congestion), WX 150 (e.g., WX1 in FIG. 3) may return the window size to the average window size or to another window size greater or less than the average window size.

If, on the other hand, the data transmission at the average window size fails (e.g., no acknowledgement is received), then WX 150 (e.g., WX1 in FIG. 3) may decrease the window size and transmit an amount of data, equal to the decreased window size, to adjacent WX 150 (e.g., WX2 in FIG. 3). Until acknowledgements are received, WX 150 (e.g., WX1 in FIG. 3) may continue decreasing the window size for subsequent data transmissions.

Block 750 of process 520 (FIG. 7) may return to block 610 of process 510 (FIG. 6) with the monitoring of the window size used during the time period. This permits the table(s) to be periodically, or continuously, updated with new information. For example, a change in a network condition, such as a link break, a link repair, or unusual congestion on a link, may cause the average window size to change. By periodically, or continuously, updating the table(s), application performance over the WAN can be increased by cutting response times and optimizing traffic flows.

Examples

Figure 8:
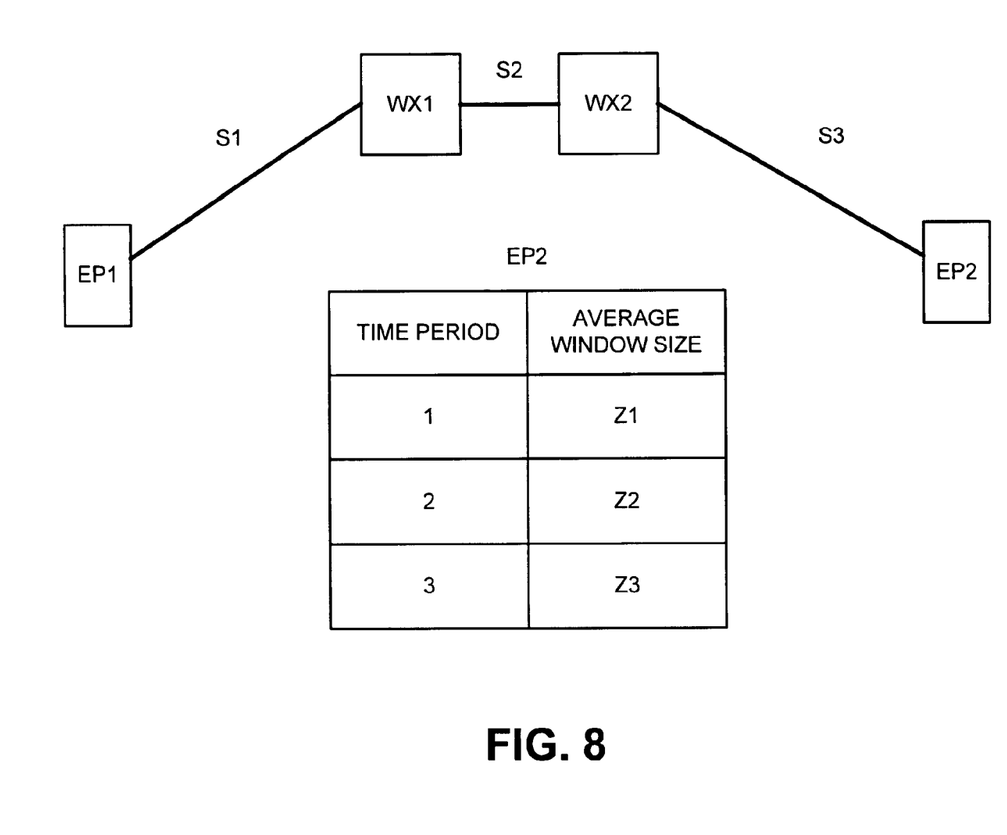
FIG. 8 is a diagram illustrating an example of a TCP connection.

FIG. 8 is a diagram illustrating an example of a TCP connection. As shown in FIG. 8, assume that an endpoint EP1 wants to communicate with an endpoint EP2, and that this communication occurs through two WXs, referred to as WX1 and WX2. EP1 may establish a TCP connection by sending a synchronization (SYN) message to EP2, receiving an acknowledgement (ACK) message from EP2, and sending an acknowledgement (ACK) message back to EP2. This exchange of messages actually causes multiple TCP connections to be established: one connection from EP1 to WX1 (e.g., the closest WX to EP1) (referred to as segment 1 (S1) in FIG. 8); one connection from WX1 to WX2 (associated with EP2) (referred to as segment 2 (S2) in FIG. 8); and one connection from WX2 to EP2 (referred to as segment 3 (S3) in FIG. 8).

Assume that WX1 has created a table that includes the average window size that has occurred on segment 2 during each of three time periods, referred to as time period 1, time period 2, and time period 3 in FIG. 8. As shown in FIG. 8, the average window size for time period 1 has been determined to be Z1, the average window size for time period 2 has been determined to be Z2, and the average window size for time period 3 has been determined to be Z3.

WX1 may receive data from EP1 for transmission to EP2. WX1 may determine the current time period and determine the corresponding average window size from the table. WX1 may set the initial window size to the average window size from the table and send an amount of data, equal to the average window size, to WX2. WX1 may then wait for an acknowledgement from WX2. If WX1 receives the acknowledgement, WX1 may increase the window size and send an amount of data, equal to the increased window size, to WX2. If, however, WX1 does not receive the acknowledgement, WX1 may decrease the window size and send an amount of data, equal to the decreased window size, to WX2.

Figure 9:
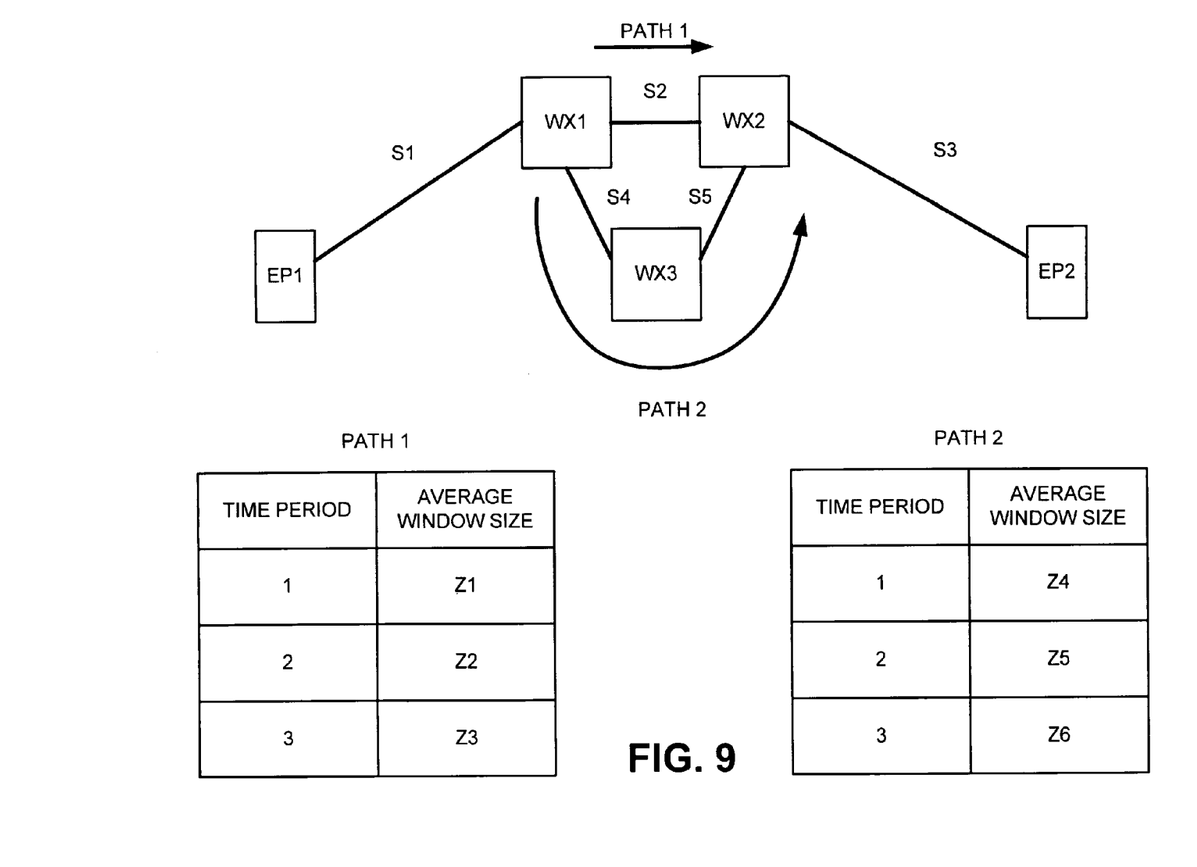
FIG. 9 is a diagram illustrating another example of a TCP connection.

FIG. 9 is a diagram illustrating another example of a TCP connection. As shown in FIG. 9, assume that an endpoint EP1 wants to communicate with an endpoint EP2, and that this communication occurs on one of two paths, referred to as path 1 and path 2. Path 1 includes a connection from WX1 to WX2. Path 2 includes a connection from WX1 to WX2 via WX3. EP1 may establish a TCP connection by sending a synchronization (SYN) message to EP2, receiving an acknowledgement (ACK) message from EP2, and sending an acknowledgement (ACK) message back to EP2. This exchange of messages actually causes multiple TCP connections to be established, which may depend on whether path 1 or path 2 is used. If path 1 is used, then a connection from EP1 to WX1 (e.g., the closest WX to EP1) (referred to as segment 1 (S1) in FIG. 9) may be established; a connection from WX1 to WX2 (associated with EP2) (referred to as segment 2 (S2) in FIG. 9) may be established; and a connection from WX2 to EP2 (referred to as segment 3 (S3) in FIG. 9) may be established. If path 2 is used, then a connection from EP1 to WX1 (referred to as segment 1 (S1) in FIG. 9) may be established; a connection from WX1 to WX3 (referred to as segment 4 (S4) in FIG. 9) may be established; a connection from WX3 to WX2 (referred to as segment 5 (S5) in FIG. 9) may be established; and a connection from WX2 to EP2 (referred to as segment 3 (S3) in FIG. 9) may be established.

Assume that WX1 has created two tables: one table for path 1 and another table for path 2. Alternatively, WX1 may create two tables: one table for segment 2 and another table for segment 4.

The table for path 1 may include the average window size that has occurred on segment 2 during each of three time periods, referred to as time period 1, time period 2, and time period 3 in FIG. 9. As shown in FIG. 9, the average window size for time period 1 has been determined to be Z1, the average window size for time period 2 has been determined to be Z2, and the average window size for time period 3 has been determined to be Z3.

The table for path 2 may include the average window size that has occurred on segments 4 and 5 during each of three time periods, referred to as time period 1, time period 2, and time period 3 in FIG. 9. As shown in FIG. 9, the average window size for time period 1 has been determined to be Z4, the average window size for time period 2 has been determined to be Z5, and the average window size for time period 3 has been determined to be Z6.

WX1 may receive data from EP1 for transmission to EP2. WX1 may select one of the two paths to use for the data transmission. WX1 may also determine the current time period and determine the corresponding average window size from the table corresponding selected path. WX1 may set the initial window size to the average window size from the table and send an amount of data, equal to the average window size, to WX2 (via path 1 or 2). WX1 may then wait for an acknowledgement from WX2. If WX1 receives the acknowledgement, WX1 may increase the window size and send an amount of data, equal to the increased window size, to WX2. If, however, WX1 does not receive the acknowledgement, WX1 may decrease the window size and send an amount of data, equal to the decreased window size, to WX2.

CONCLUSION

Implementations, described herein, may increase application performance over a WAN by, for example, selecting an initial TCP window size based on past performance between particular endpoints during particular time periods.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-7, the order of the blocks may be modified in other implementations. Further, non-dependent blocks may be performed in parallel.

Also, the foregoing description refers to a window size for TCP connections as the amount of data to be transmitted in a TCP message. The term "data size" may generally refer to the amount of data to be transmitted within or outside the TCP context.

Further, it has been described that the initial window size may be set based on the average window size and the particular service(s) that were selected for the destination. In one alternative implementation, the initial window size may be set based on the particular service(s) that were selected without taking the average window size into consideration.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
monitoring, by a first network device, a data size of data transmitted by the first network device to a second network device during a first time period;
determining, by the first network device and based on the monitored data size, an average data size for the second network device and for the first time period,
determining the average data size including at least one of:
performing a moving average calculation on the monitored data size, or
performing an average calculation on the monitored data size for a set period;
establishing, by the first network device, a data connection for transmitting data to the second network device during a second time period,
the second time period corresponding to the first time period;
identifying, by the first network device, one or more of:
an acceleration service,
a data compression service,
a data caching service, or
a data prefetching service,
the one or more of the acceleration service, the data compression service, the data caching service, or the data prefetching service to be provided by the first network device in conjunction with transmitting the data to the second network device;
setting, by the first network device and based on the average data size and the identified one or more of the acceleration service, the data compression service, the data caching service, or the data prefetching service, an initial data size for transmitting an initial amount of the data to the second network device, via the data connection, the initial amount comprising an amount equal to the initial data size; and
transmitting, by the first network device and during the second time period, the initial amount of the data on the data connection to the second network device.

2. The method of claim 1,
where monitoring the data size of the data transmitted to the second network device includes:
monitoring the data size of the data transmitted to the second network device during a plurality of first time periods that include the first time period,
where determining the average data size for the second network device includes:
determining, based on the monitored data size, a plurality of average data sizes for the plurality of first time periods, and
where the plurality of average data sizes include the average data size.

3. The method of claim 2, further comprising:
storing, in a memory, the plurality of average data sizes with information regarding the plurality first of time periods,
the memory being associated with the second network device.

4. The method of claim 2, further comprising:
determining a current time period for establishing the data connection; and
determining, based on information regarding the current time period, one of the plurality of average data sizes corresponding to the current time period.

5. The method of claim 1,
where establishing the data connection includes establishing a Transmission Control Protocol (TCP) connection, and
where the initial data size includes an initial window size for the TCP connection.

6. The method of claim 1, further comprising:
determining whether an acknowledgement has been received based on transmitting the initial amount of data on the data connection;
modifying the initial data size based on whether the acknowledgement has been received; and
transmitting additional data on the data connection in an amount equal to the modified initial data size.

7. The method of claim 6, where modifying the initial data size includes:
increasing the initial data size to an increased data size when the acknowledgement has been received.

8. The method of claim 6, further comprising:
detecting congestion based on determining that another acknowledgement has not been received after transmitting the additional data; and
setting, based on detecting the congestion, a data size, for a subsequent data transmission on the data connection, to a data size that is equal to the initial data size.

9. The method of claim 7, further comprising:
detecting congestion related to transmitting the additional data; and
setting, based on detecting the congestion, a data size, for a subsequent data transmission on the data connection, to a data size that is greater than the initial data size and that is smaller than the increased data size.

10. The method of claim 1, further comprising:
detecting congestion related to transmitting the initial amount of the data; and
setting, based on detecting the congestion, a data size, for a subsequent data transmission on the data connection, to a data size that is smaller than the initial data size.

11. The method of claim 6, further comprising:
decreasing the initial data size to a decreased data size when the acknowledgement has not been received.

12. The method of claim 1,
where the first network device comprises a first wide area network (WAN) accelerator,
where the second network device comprises a second WAN accelerator,
where monitoring the data size of the data transmitted by the first network device to the second network device during the first time period includes:
monitoring the data size of the data transmitted by the first network device to the second network device during the first time period based on the second network device comprising the second WAN accelerator;
where identifying the one or more of the acceleration service, the data compression service, the data caching service, or the data prefetching service, includes:
identifying one or more of the acceleration service, the data compression service, the data caching service, or the data prefetching service that is not to be provided by the first network device in conjunction with transmitting the data to the second network device, and
where setting the initial data size for the data connection includes:
setting the initial data size further based on the one or more of the acceleration service, the data compression service, the data caching service, or the data prefetching service that is not to be provided by the first network device in conjunction with transmitting the data to the second network device.

13. A network device comprising:
a processor to:
monitor a window size of Transmission Control Protocol (TCP) data transmitted from the network device toward a particular destination during a plurality of time periods,
determine, based on the monitored window size, an average window size for the particular destination and an average window size for each time period, of the plurality of time periods,
when determining the average window size, the processor is to at least one of:
perform a moving average calculation on the monitored window size, or
perform an average calculation on the monitored window size for a set period,
establish a TCP connection to transmit data toward the particular destination,
determine a current time period of the plurality of time periods,
determine an average window size corresponding to the current time period,
identify one or more of:
an acceleration service,
a data compression service,
a data caching service, or
a data prefetching service,
the one or more of the acceleration service, the data compression service, the data caching service, or the data prefetching service being provided in conjunction with transmitting the data to the particular destination,
set, based on the determined average window size and the identified one or more of the acceleration service, the data compression service, the data caching service, or the data prefetching service, an initial window size for the TCP connection during a corresponding time period, and
transmit, during the corresponding time period, an initial amount of the data on the TCP connection,
the initial amount comprising an amount equal to the initial window size.

14. The network device of claim 13, where the processor is further to:
determine whether an acknowledgement has been received based on transmitting the initial amount of the data on the TCP connection, and
determine a subsequent amount of data to transmit on the TCP connection based on whether the acknowledgement has been received.

15. The network device of claim 14,
where, when determining whether the acknowledgement has been received, the processor is further to:
determine that the acknowledgement has been received, and
where, when determining the subsequent amount, the processor is to:
increase the initial window size to an increased window size based on determining that the acknowledgement has been received.

16. The network device of claim 15,
where the processor is further to:
detect congestion, where congestion is detected based on determining that an acknowledgement associated with the increased window size has not been received, and
where, when determining the subsequent amount, the processor is to:
set, based on detecting the congestion, a window size, for a subsequent data transmission on the TCP connection, to a window size that is equal to the initial window size.

17. The network device of claim 15, where the processor is further to:
detect congestion related to the increased window size, and
set, based on detecting the congestion, another window size, for a subsequent data transmission on the TCP connection, to a new window size that is greater than the initial window size and that is smaller than the increased window size.

18. The network device of claim 13, where the processor is further to:
detect congestion, and
set, based on detecting the congestion, a window size, for a subsequent data transmission on the TCP connection, to a window size that is smaller than the initial window size.

19. The network device of claim 14,
where, when determining whether the acknowledge has been received, the processor is further to:
determine that the acknowledgement has not been received,
where, when determining the subsequent amount, the processor is to:
decrease the initial window size to a decreased window size based on determining that the acknowledgement has not been received.

20. The network device of claim 13,
where the network device comprises a first wide area network (WAN) accelerator, and
where the particular destination comprises a second WAN accelerator.

21. A system comprising:
a first network device connected to a second network device via a plurality of paths through a wide area network, the first network device being to:
monitor a data size of data transmitted by the first network device to the second network device over each of the plurality of paths during a plurality of time periods,
determine, based on the monitored data size, an average data size for each of the plurality of paths and for each of the plurality of time periods,
when determining the average data size, the first network device is to:
perform a moving average calculation on the monitored data size, or
perform an average calculation on the monitored data size for a set period,
establish a data connection with the second network device via one of the plurality of paths,
identify one or more of:
an acceleration service,
a data compression service, a data caching service, or
a data prefetching service,
the one or more of the acceleration service, the data compression service, the data caching service, or the data prefetching service to be provided by the network device in conjunction with transmitting the data to the second network device via the one of the plurality of paths,
set an initial data size for the data connection based on the average data size and the identified one or more of the acceleration service, the data compression service, the data caching service, or the data prefetching service, and
transmit an initial amount of data comprising an amount equal to the initial data size.

22. The system of claim 21,
where the first network device is further to:
store, in a memory, the average data size with information regarding a corresponding one of the plurality of time periods, and
where the memory is associated with the one of the plurality of paths.

23. The system of claim 22, where the first network device is further to:
use information regarding the current time period as an index into the memory to determine the average data size corresponding to the current time period.

24. The system of claim 21,
where the data connection includes a Transmission Control Protocol (TCP) connection, and
where the initial data size includes an initial window size for the TCP connection.

25. The system of claim 21, where the first network device is further to:
determine that an acknowledgement has been received based on transmitting the initial amount of data on the data connection,
increase the initial data size to an increased data size based on determining that the acknowledgement has been received, and
transmit additional data on the data connection in an amount equal to the increased data size.

26. The system of claim 21, where the first network device is further to:
determine that no acknowledgement has been received based on transmitting the initial amount of data on the data connection,
decrease the initial data size to a decreased data size based on determining that no acknowledgement has been received, and
transmit additional data on the data connection in an amount equal to the decreased data size.

27. A system comprising:
a network device to:
record a data size of data transmitted toward a particular destination during a particular time period;
determine, based on the recorded data size, an average data size for the particular destination and the particular time period,
when determining the average data size, the network device is to:
perform a moving average calculation on the recorded data size, or
perform an average calculation on the recorded data size for a set period;
establish a data connection toward the particular destination;
identify one or more of:
an acceleration service,
a data compression service,
a data caching service, or
a data prefetching service,
the one or more of the acceleration service, the data compression service, the data caching service, or the data prefetching service being provided in conjunction with transmitting data to the particular destination;
determine that a current time period matches the particular time period;
set an initial data size for transmitting data on the data connection based on the average data size and the identified one or more of the acceleration service, the data compression service, the data caching service, or the data prefetching service; and
transmit an initial amount of the data on the data connection,
the initial amount comprising an amount equal to the initial data size.

28. The system of claim 27, where the network device is further to:
determine that an acknowledgement has been received based on transmitting the initial amount of the data on the data connection;
increase the initial data size to an increased data size based on determining that the acknowledgement has been received; and
transmit an additional amount of the data on the data connection, where the additional amount comprises an amount equal to the increased data size.

29. The system of claim 27, where the network device is further to:
determine that no acknowledgement has been received based on transmitting the initial amount of the data on the data connection;
decrease the initial data size to a decreased data size based on determining that no acknowledgement has been received; and
transmit an additional amount of the data on the data connection, where the additional amount comprises an amount equal to the decreased data size.

30. The system of claim 27, where the network device is further to:
determine a subsequent window size for a subsequent data transmission,
determine whether the average window size satisfies a particular condition based on the subsequent window size, and
update a table based on the average window size when the average window size satisfies the particular condition.

* * * * *